United States Patent
Moughton

(10) Patent No.: US 10,682,014 B2
(45) Date of Patent: Jun. 16, 2020

(54) APPARATUS FOR HEATING FOOD

(71) Applicant: Strix Limited, Ronaldsway (GB)

(72) Inventor: Colin Moughton, Port St Mary (GB)

(73) Assignee: Strix Limited, Ronaldsway (IM)

( * ) Notice: Subject to any disclaimer, the term of this patent is extended or adjusted under 35 U.S.C. 154(b) by 0 days.

(21) Appl. No.: 14/903,939

(22) PCT Filed: Jul. 8, 2014

(86) PCT No.: PCT/GB2014/052080
§ 371 (c)(1),
(2) Date: Jan. 8, 2016

(87) PCT Pub. No.: WO2015/004445
PCT Pub. Date: Jan. 15, 2015

(65) Prior Publication Data
US 2016/0166111 A1    Jun. 16, 2016

(30) Foreign Application Priority Data

Jul. 9, 2013 (GB) .................................. 1312319.5
Aug. 7, 2013 (GB) .................................. 1314137.9
Nov. 13, 2013 (GB) .................................. 1320043.1

(51) Int. Cl.
*A47J 37/08* (2006.01)

(52) U.S. Cl.
CPC ........... *A47J 37/0835* (2013.01); *A47J 37/08* (2013.01)

(58) Field of Classification Search
CPC .... A47J 37/0814; A47J 37/0821; A47J 27/62; A47J 37/0835

USPC ........ 99/325, 327, 328, 329 R, 329 RT, 331, 99/332, 333, 335; 219/411; 426/240, 426/243

See application file for complete search history.

(56) References Cited

U.S. PATENT DOCUMENTS 2,364,175 A    12/1944 Turner
2,604,032 A    7/1952 Dooley
(Continued)

FOREIGN PATENT DOCUMENTS

CN    1779331    5/2006
JP    60165429    8/1985
(Continued)

OTHER PUBLICATIONS

Chen, Jason "Turbo Toast Prototype Jet Engines Make Your Toast", Dec. 19, 2007, http://gizmodo.com/335843/turbo-toaster-prototype-jet-engines-make-your-toast.

(Continued)

*Primary Examiner* — Jimmy Chou
(74) *Attorney, Agent, or Firm* — Getz Balich LLC

(57) ABSTRACT

An apparatus for toasting a food item is arranged to receive and support said food item during toasting. The apparatus includes a heating element arranged to heat the surface of the food item by radiant heat and a fan arranged to blow air across the food item. The apparatus is arranged to operate in a first mode in which the fan is operative and a second mode in which the fan is reduced in speed or turned off. The apparatus is arranged to change from the first mode to the second mode automatically upon a predetermined condition being met. Other ways of moving air across the food item that do not use a fan are also disclosed.

22 Claims, 3 Drawing Sheets

(56) References Cited

U.S. PATENT DOCUMENTS

| | | | |
|---|---|---|---|
| 2,684,427 A | 7/1954 | Gross | |
| 3,358,584 A | 12/1967 | Sutton et al. | |
| 4,286,509 A | 9/1981 | Miller et al. | |
| 4,368,379 A | 1/1983 | Swanson | |
| RE31,415 E | 10/1983 | Price et al. | |
| 4,510,376 A | 4/1985 | Schneider | |
| 4,692,597 A * | 9/1987 | Tsuda | H05B 6/6458 219/492 |
| 5,036,179 A | 7/1991 | Westerberg et al. | |
| 5,193,439 A | 3/1993 | Finesman et al. | |
| 5,319,171 A * | 6/1994 | Tazawa | F24C 7/087 219/492 |
| 5,402,708 A | 4/1995 | Krasznai et al. | |
| 5,426,280 A | 6/1995 | Smith | |
| 5,705,791 A * | 1/1998 | Sutton | A47J 37/0842 219/492 |
| 5,802,957 A | 9/1998 | Wanat et al. | |
| 5,821,503 A * | 10/1998 | Witt | A21B 1/48 219/388 |
| 5,960,704 A | 10/1999 | March et al. | |
| 6,051,818 A | 4/2000 | Van Der Wal et al. | |
| 6,140,621 A | 10/2000 | Ho et al. | |
| 6,355,915 B1 * | 3/2002 | Ziaimehr | G05D 23/1913 219/412 |
| 6,753,510 B2 * | 6/2004 | Lile | A47J 37/0842 219/398 |
| 6,878,912 B2 * | 4/2005 | Lee | H05B 6/6473 219/705 |
| 7,009,147 B1 * | 3/2006 | Schulte | F24C 7/06 219/400 |
| 7,060,941 B1 * | 6/2006 | Embury | F24C 7/08 219/401 |
| 7,307,243 B2 * | 12/2007 | Farkas | A21B 1/48 219/388 |
| 7,488,919 B2 * | 2/2009 | Gagas | F24C 7/087 219/400 |
| 7,592,570 B2 * | 9/2009 | Yoder | A21B 1/26 219/388 |
| 7,750,271 B2 * | 7/2010 | Smith | F24C 7/08 219/391 |
| 8,049,142 B2 | 11/2011 | Blackson et al. | |
| 8,071,918 B2 * | 12/2011 | Veltrop | H05B 1/0263 219/385 |
| 8,669,500 B2 * | 3/2014 | Hensel | A47J 37/0807 219/483 |
| 8,766,144 B2 * | 7/2014 | McLoughlin | F24C 7/08 219/391 |
| 2001/0050277 A1 | 12/2001 | Friel, Sr. | |
| 2003/0140796 A1 | 7/2003 | Donglei | |
| 2003/0213371 A1 | 11/2003 | Saunders | |
| 2004/0040953 A1 | 3/2004 | Hun et al. | |
| 2005/0077290 A1 * | 4/2005 | Lee | A47J 37/0842 219/685 |
| 2006/0263073 A1 * | 11/2006 | Clarke | F24H 9/2071 392/347 |
| 2007/0012307 A1 * | 1/2007 | Wiker | A21B 1/48 126/21 A |
| 2008/0067166 A1 | 3/2008 | Yoder et al. | |
| 2008/0087173 A1 * | 4/2008 | Milz | A21B 1/245 99/331 |
| 2008/0092754 A1 * | 4/2008 | Noman | A21B 1/245 99/443 C |
| 2010/0006561 A1 * | 1/2010 | Hensel | A47J 37/0807 219/483 |
| 2010/0239724 A1 * | 9/2010 | Veltrop | A47J 37/08 426/240 |
| 2011/0041696 A1 * | 2/2011 | Aemisegger | A47J 31/3623 99/281 |
| 2011/0048244 A1 * | 3/2011 | Wiker | A21B 1/245 99/331 |
| 2011/0277643 A1 * | 11/2011 | Schwierking | A47J 36/32 99/331 |
| 2011/0303100 A1 * | 12/2011 | Agnello | A47J 37/0807 99/443 C |
| 2013/0156906 A1 * | 6/2013 | Raghavan | A47J 37/0641 426/243 |

FOREIGN PATENT DOCUMENTS

| | | |
|---|---|---|
| JP | 6090862 | 4/1994 |
| JP | 8024144 | 1/1996 |
| KR | 20050083332 | 8/2005 |
| WO | 0053068 | 9/2000 |
| WO | 2007013031 | 2/2007 |

OTHER PUBLICATIONS

Office action for CN201480039049.6 dated Sep. 5, 2018.

* cited by examiner

APPARATUS FOR HEATING FOOD

This application is entitled to the benefit of, and incorporates by reference essential subject matter disclosed in PCT Application No. PCT/GB14/52080 filed Jul. 8, 2014, which claims priority to GB Patent Application No. 1312319.5 filed Jul. 9, 2013, GB Patent Application No. 1314137.9 filed Aug. 7, 2013 and GB Patent Application No. 1320043.1 filed Nov. 13, 2013.

BACKGROUND OF THE INVENTION

1. Technical Field

This invention relates to apparatus for dry heating of food e.g. toasters.

2. Background Information

Making toast using a dedicated appliance which comprises one or more vertical slots for receiving slices of bread and heats the bread to turn it into toast, remains extremely popular. The Applicant has recognized that there are essentially two stages involved in the process of making toast. The first stage is drying out the surface of the bread. The second is the browning process which is known as the Maillard effect. The Maillard effect is behind many cooking processes, and is responsible for the browning and change in taste in certain foodstuffs, for example meat, onions or bread, when they are cooked. The Maillard effect comprises a set of chemical reactions between an amino acid (usually from a protein) and carbonyl compounds, usually sugars. They react in the presence of heat to form flavor compounds, which in turn break down to form different compounds. The resulting combination of compounds determines the taste and smell of the food when it has finished cooking.

The Maillard reactions take place between around 120 and 150° C. and in a typical toaster take only approximately 20 seconds to produce browned toast. However before these reactions can begin, the water present in the surface of the bread must be evaporated as this holds the surface temperature below 100° C. This process can take several minutes in a conventional toaster.

The Applicant's recognition is that whilst the Maillard effect is important in determining the taste and texture of the finished toast and should therefore be retained, the initial drying stage can be accelerated, thereby reducing the overall time taken to toast the bread.

SUMMARY OF THE DISCLOSURE

When viewed from a first aspect, the present invention provides an apparatus for toasting a food item arranged to receive and support said food item during toasting and comprising a heating element arranged to heat the surface of the food item by radiant heat and a fan arranged to blow air across the food item, wherein the apparatus is arranged to operate in a first mode in which the fan is operative and a second mode in which the fan is reduced in speed or turned off, wherein the apparatus is arranged to change from the first mode to the second mode automatically upon a predetermined condition being met.

Thus it will be seen by those skilled in the art that in accordance with the invention the apparatus operates in two modes, and switches between them automatically. The point in time at which the inevitable switch from the first mode to the second mode takes place is dictated by the predetermined condition being met. By providing a fan operative in the first mode, a higher volume of air is moved across the surface of the food item being toasted, for example a piece of bread, which encourages moisture to evaporate from the surface more quickly. This decreases the overall cooking time.

By reducing or, preferably, switching off the fan for the second mode, the food item can be toasted by radiant heat from the element using the Maillard effect in the normal way.

It has been found that embodiments of the invention can produce good quality toast in as little as one minute.

In a set of embodiments, an operating power of the heating element is the same during both the first and second modes of operation.

However, in a set of embodiments a higher heating power is used during the first mode than during the second mode. This may help to mitigate the potential cooling effect of the fan on the element which might otherwise act to offset the reduction in drying time. In typical conventional toasters the elements have a power of only between 900 and 1200 W, since if too high a power is used the toast will tend to burn.

When viewed from a second aspect the invention provides an apparatus for toasting a food item arranged to receive and support said food item during toasting and comprising a heating element arranged to heat the surface of the food item by radiant heat and a fan arranged to blow air across the food item, wherein the apparatus is arranged to operate in a first mode in which the fan is operative and in which a first heating power is used and a second mode in which the fan is reduced in speed or turned off and in which a second, lower heating power is used, wherein the apparatus is arranged to change from the first mode to the second mode automatically at a time dictated by a predetermined condition being met.

Thus it will be seen that in accordance with this aspect of the invention the higher heating power is associated with the fan being (maximally) operative and the lower heating power is associated with the fan being switched off or reduced in speed. It is not essential that the reduction in power and switching off or reduction in speed of the fan are simultaneous; there may be a staggered transition. However in each heating cycle there will be two main modes—one with the heating power and fan speed high and one with the heating power low and fan speed low or zero.

It will be appreciated that the apparatus may have other functions in which a fan is not used but where it is used in accordance with this aspect of the invention, the fan speed and heating power will have coupled transitions.

In an alternative set of embodiments, a lower heating power is used during the first mode than during the second mode.

When viewed from a third aspect, the invention provides an apparatus for toasting a food item arranged to receive and support said food item during toasting and comprising a heating element arranged to heat the surface of the food item by radiant heat and a fan arranged to blow air across the food item, wherein the apparatus is arranged to operate in a first mode in which the fan is operative and in which a first heating power is used and a second mode in which the fan is reduced in speed or turned off and in which a second, higher heating power is used, wherein the apparatus is arranged to change from the first mode to the second mode automatically at a time dictated by a predetermined condition being met.

When viewed from a fourth aspect the invention provides an apparatus for toasting a food item arranged to receive and support said food item during toasting, comprising a fan arranged to blow air towards the food item and a heating arrangement arranged to apply heat to the food item, wherein the fan is arranged to operate initially at a first speed and after a fan transition point to operate at a second, lower speed or to stop and wherein the heating arrangement is arranged to operate initially at a first power and after a heating transition point to operate at a second, lower power, wherein at least one of the fan transition point and the heating transition point is determined by a predetermined condition being met, with the other of the fan and heater transition points being simultaneous or occurring automatically thereafter.

The higher heating power during the first mode may be achieved by increasing the current through the element but in a set of embodiments at least one additional element is provided, said additional element being energized in the first mode. It could also be a radiant element, arranged to heat the food item radiantly. However this is not essential: the additional element could be used to heat the air blown by the fan without directly heating the food item. It is even envisaged that the first-recited radiant element might not operate in the first mode such that the first and second modes could have dedicated respective heating elements associated therewith. The additional element may be reduced in power or switched off during the second mode. More than one additional element could be provided.

When viewed from a fifth aspect the invention provides an apparatus for toasting a food item arranged to receive and support said food item during toasting, comprising a fan arranged to blow air towards the food item and a heating arrangement arranged to apply heat to the food item, wherein the fan is arranged to operate initially at a first speed and after a fan transition point to operate at a second, lower speed or to stop and wherein the heating arrangement is arranged to operate initially at a first power and after a heating transition point to operate at a second, higher power, wherein at least one of the fan transition point and the heating transition point is determined by a predetermined condition being met, with the other of the fan and heater transition points being simultaneous or occurring automatically thereafter.

The higher heating power during the second mode may be achieved by increasing the current through the element but in a set of embodiments at least one additional element is provided, said additional element being energized in the second mode. The additional element may be reduced in power or switched off during the first mode. More than one additional element could be provided.

The elements may each have a small spatial volume, but in a preferred set of embodiments they are spatially distributed throughout the toaster. The elements may be arranged such that they heat different sides of the food item, but in a set of embodiments they are arranged such that both the first-recited and second-recited elements are distributed around all sides of the food item. Alternatively, the elements may each maintain a small spatial volume, with a number of elements connected in series to form an effective first element, and a second set of elements connected to form an effective second element. These can therefore be controlled as two whole entities (the effective elements), or alternatively each element can be controlled individually in order to alter the total power of the effective element.

In a set of embodiments an overall power of between 500 and 1500 W, e.g. between 900 and 1200 W is employed during the lower power mode. The overall power employed in the higher power mode may be more than 1500 W—e.g. more than 2000 W.

In a set of embodiments the power is changed by at least 50% e.g. at least 100% in the first mode compared to the second mode.

The fan may be arranged to blow air across the food item in any direction, but in a set of embodiments, the fan is arranged to blow air from the bottom to the top of the food item. This air may then be blown out of the top of the toaster, helping water evaporating from the food item to leave the toaster.

The fan may blow air directly across the food item, but in a set of embodiments the apparatus comprises an air duct, for conveying air from the fan to the food item. The air duct may terminate in at least one nozzle to direct the air flow. This can increase the flexibility in the toaster arrangement, for example allowing the number and arrangement of food items to be changed or to accommodate a greater variety of industrial designs.

The predetermined condition which triggers the automatic transition from the first to the second mode could take a number of forms. Ideally the transition should occur when the Maillard effect is beginning to take place. In a preferred set of embodiments, the predetermined condition comprises a time—which might be dependent, for example, on a user setting indicating the type of food item being toasted or on the initial temperature of the apparatus (e.g. a lower time being selected if the apparatus is still warm from a previous use). It could alternatively or additionally comprise another parameter such as the water content of the air inside the apparatus, a change in the optical characteristics of the surface of the food item, or a temperature of the surface of the food item.

In an alternative set of embodiments however the condition comprises the air temperature in the vicinity of the food item. The temperature could be measured electronically—e.g. using a thermistor or a thermocouple. In a set of embodiments however a thermo-mechanical actuator such as a bimetallic actuator is used—e.g. acting to open a pair of electrical contacts. Such an arrangement is reliable, robust and cost-effective. The optimum operating temperature of the actuator may be determined empirically.

It will be appreciated therefore that in accordance with some embodiments of the invention the state of the food item may influence the point in time at which the apparatus switches from the first to the second mode (amongst other things) but it cannot influence the fact of the switch happening.

In a set of embodiments the apparatus is arranged to transition automatically to an 'off' state, in which both the fan and heating element are switched off, upon a further predetermined condition being met. This condition could comprise any of the parameters mentioned above in respect of the predetermined condition governing change from the first mode to the second mode. In a set of embodiments the further predetermined condition comprises a time. This may be a time since initial switching on or a time since the change from the first to the second mode. The latter may give greater control over the degree of browning since it controls the length of time for which the Maillard effect persists.

The aforementioned transition to the 'off' state may be accompanied by an ejection of the food item. For example in a set of embodiments the apparatus comprises a spring loaded elongate arm on which the food item rests, the spring being released when the apparatus transitions to said off state.

In a preferred set of embodiments, the transition is controlled by electronic circuitry, which changes the mode of operation depending on the time that has passed e.g. since the toaster was switched on. In a set of embodiments, a clock is included in the electronics, and preferably a first transition occurs at a first time limit, followed by a second transition (to the 'off' state) at a second time limit. These time limits may be altered where necessary to ensure the correct balance of drying and browning is obtained.

The apparatus preferably comprises one or more vertical slots for receiving the food item—e.g. a slice of bread. The food item is preferably supported in a vertical position in the apparatus, i.e. with its largest cross-sectional area being defined by a vertical plane.

The fan may be powered by a mains AC power supply along with the heating element, but alternatively it is powered using a separate power supply, e.g. a low voltage DC power supply.

In a set of embodiments the apparatus comprises a cover over a region containing the heating element and food item. This may allow the region to increase in temperature more rapidly, increasing the speed of drying and therefore toasting.

Although fans are considered to be the most practical way of generating the required air flow, the Applicant has recognized that other ways of forcing air flow might be used. Thus when viewed from a sixth aspect, the present invention provides an apparatus for toasting a food item arranged to receive and support said food item during toasting and comprising a heating element arranged to heat the surface of the food item by radiant heat and a forced air flow device arranged to blow air across the food item, wherein the apparatus is arranged to operate in a first mode in which the forced air flow device is operative and a second mode in which the flow from the forced air flow device is reduced or turned off, wherein the apparatus is arranged to change from the first mode to the second mode automatically upon a predetermined condition being met.

The forced air flow device may comprise a fan. Alternatively, it may comprise an air pump that does not have a fan, for example a positive displacement pump. In a set of embodiments, the forced air flow device blows air directly across the food item, but alternatively it may blow air indirectly across the food item, for example through an air duct as described above.

As will be appreciated by those skilled in the art, features and embodiments of one aspect of the invention will also pertain to other aspects of the invention where technically relevant.

BRIEF DESCRIPTION OF THE DRAWINGS

A number of embodiments of the invention will now be described, by way of example only, with reference to the accompanying drawings in which.

DETAILED DESCRIPTION OF THE INVENTION

Figure 1:
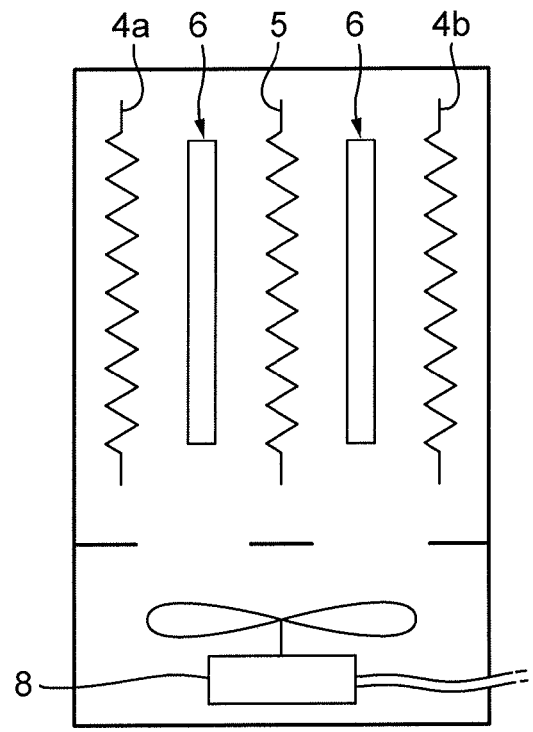
FIG. 1 shows a plan view of an embodiment of the invention.

FIG. 1 shows a plan view of a toaster 2 which embodies the invention as claimed, having a two-stage cooking process with an automatic transition between the stages. The toaster 2 contains three heating elements 4a, 4b, 4c which are spaced either side of two vertical slots arranged to receive and support vertically respective slices of bread 6.

Figure 2:
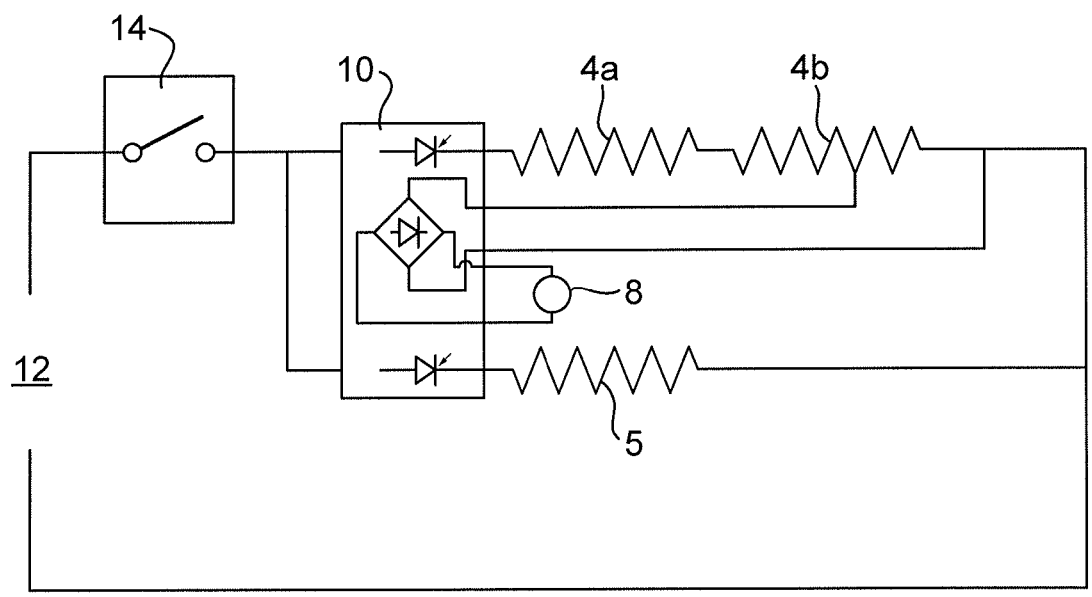
FIG. 2 shows a circuit diagram for the embodiment of FIG. 1.

At one end of the heating elements is a fan 8, which is arranged to blow air across the face the bread 6. The fan is connected to a 12 V DC power supply which is arranged electrically in parallel with two of the heating elements 4a, 4c. This can be seen from FIG. 2, which shows a circuit diagram for the arrangement of FIG. 1. Element 4a has a cold resistance of R1, element 4b has a cold resistance of R2 and element 4c has a cold resistance of R3. In one example R1=13.7Ω, R2=19 Ω and R3=13.4Ω. A control printed circuit board assembly (PCBA) 10 is connected to elements 4a, 4b and 4c and fan 8, and is able to control the operation of these components in order to transition between the different toasting modes. The control PCBA 10 is connected to a 220-240 V AC power supply 12 and a magnet PCBA 14. The magnet PCBA 14 is used to control the position of the bread 6 within the toaster 2.

When the toaster 2 is switched on, the magnet PCBA 14 is switched such that the bread 6 is held substantially within the toaster 2, as it attracts the elongate arm (not shown) on which the bread is resting. When toasting is complete, and the toaster 2 transitions to the 'off' position, the magnet 14 is switched off, releasing the elongate arm and bread 6 from its position within the toaster 2 such that it can be accessed by a user. The magnet PCBA 14 also acts as a switch for the rest of the toaster components. They are not able to receive power unless the magnet is activated and attracting the elongate arm so that the bread 6 is in a suitable position for toasting. When the magnet is switched off in the transition to the 'off' state, it cuts the power to the rest of the components, preventing elements 4a, 4b, 4c and fan 8 from operating.

The control PCBA 10 is used to switch between the different modes of operation by controlling which of the components are receiving power at any time. In particular, it determines whether elements 4a, 4c and fan 8 are switched on, as in the transition from the first to second mode these are preferably all switched off in order to reduce the total power and start the browning process. Alternatively, in the transition to the second mode, the power to all three elements 4a, 4b, 4c and to the fan 8 may instead be reduced. This would cause the overall power to be reduced, lowering the temperature and air speed such that the toast can brown without actually switching any of the components off.

In an alternative set of embodiments, the transitions may instead be controlled using a snap-acting bimetallic actuator (not shown). This is provided in the cavity with the elements 4a, 4b, 4c and the bread 6 so as to be sensitive to the air temperature inside the cavity. The actuator operates at a predetermined temperature of say 150° C. so as snap to a reverse curvature and thereby act on a pair of electrical contacts to separate them. These contacts are in series with the fan power supply and the outer two elements 4a, 4c so that in operation it simultaneously turns off the fan 8 and the outer heating elements 4a, 4c. This allows the remaining element 4b to brown the toast for the remainder of operation (i.e. entering the second mode).

Figure 3:
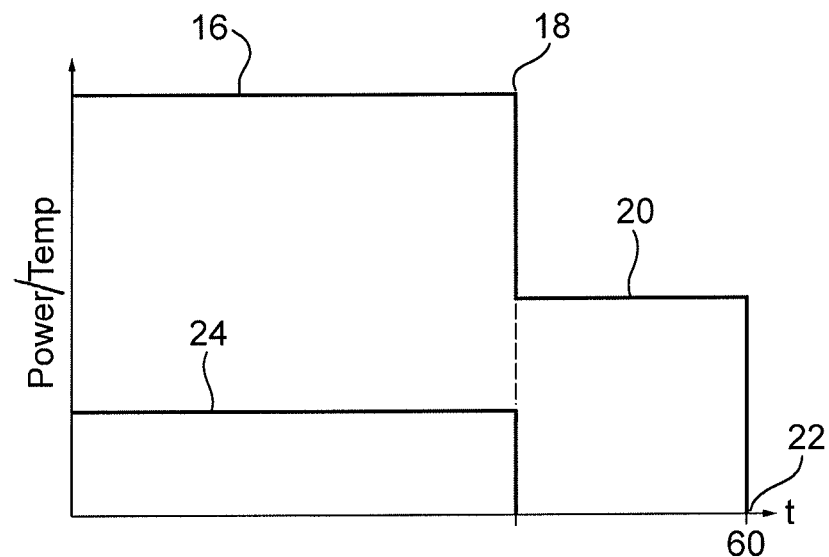
FIG. 3 shows a graph demonstrating the different modes of operation used.

FIG. 3 shows a graph of power against time for one cooking cycle of the toaster 2. As can be seen, the power is initially at a maximum P1=2.5 kW as all three elements 4a, 4b, 4c are energized and the fan is in operation. However, at transition point 16 the drying process is completed so the heating elements 4a, 4c are switched off by the control PCBA 10 or bimetal to reduce the overall power, P2=1.1 kW. At the same time, the fan 8 is switched off as it is no longer needed to dry out the bread. The toaster 2 remains in this mode for the remainder of the cooking time as set by a timer until, at end point 12, it automatically switches into the 'off' state, in which both the heating element 4b and the fan 8 are switched off. At this point, after approximately one minute, the bread 6 is fully toasted and the entire cooking process should have been completed, as shown by the time scale. In this embodiment, P1 is 2.5 kW, and P2 is 1.1 kW, but these may vary. For example, 1<P1<3 kW, and 0.88<P2<2.2 kW. The power levels may depend on the mains power available, or alternatively on factors such as the desired total toasting time.

Figure 4:
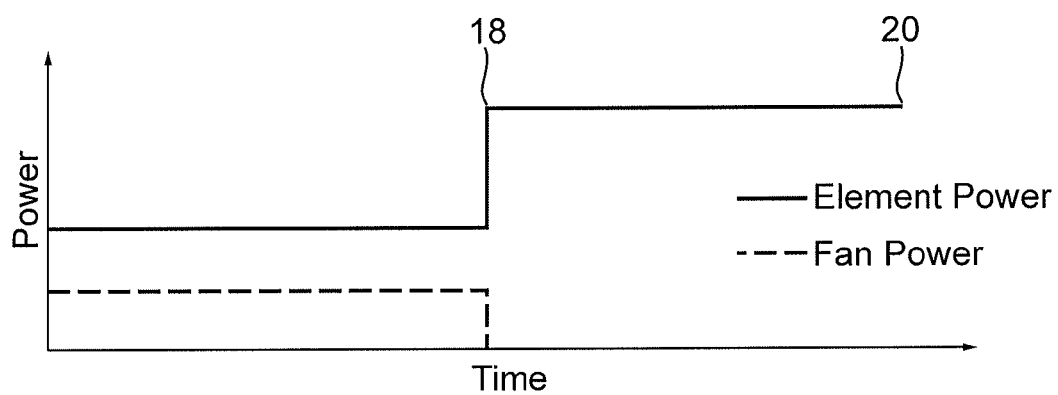
FIG. 4 shows a graph demonstrating a mode of operation for an alternative embodiment of the invention.

FIG. 4 demonstrates an alternative mode of operation. It is a graph of power against time for one cooking cycle of the toaster 2. As can be seen, the power of the heating elements 4a, 4b, 4c is increased when the fan 8 is switched off at the transition point 18 at the end of the drying process. The toaster 2 then remains in this mode of increased power elements 4a, 4b, 4c and no fan for the remainder of the cooking time (as set by a timer), until it automatically switches off 20. The bread should then be fully and evenly toasted. As with FIG. 3, the power levels used may depend on the mains power available, or the desired total toasting time.

Figure 5:
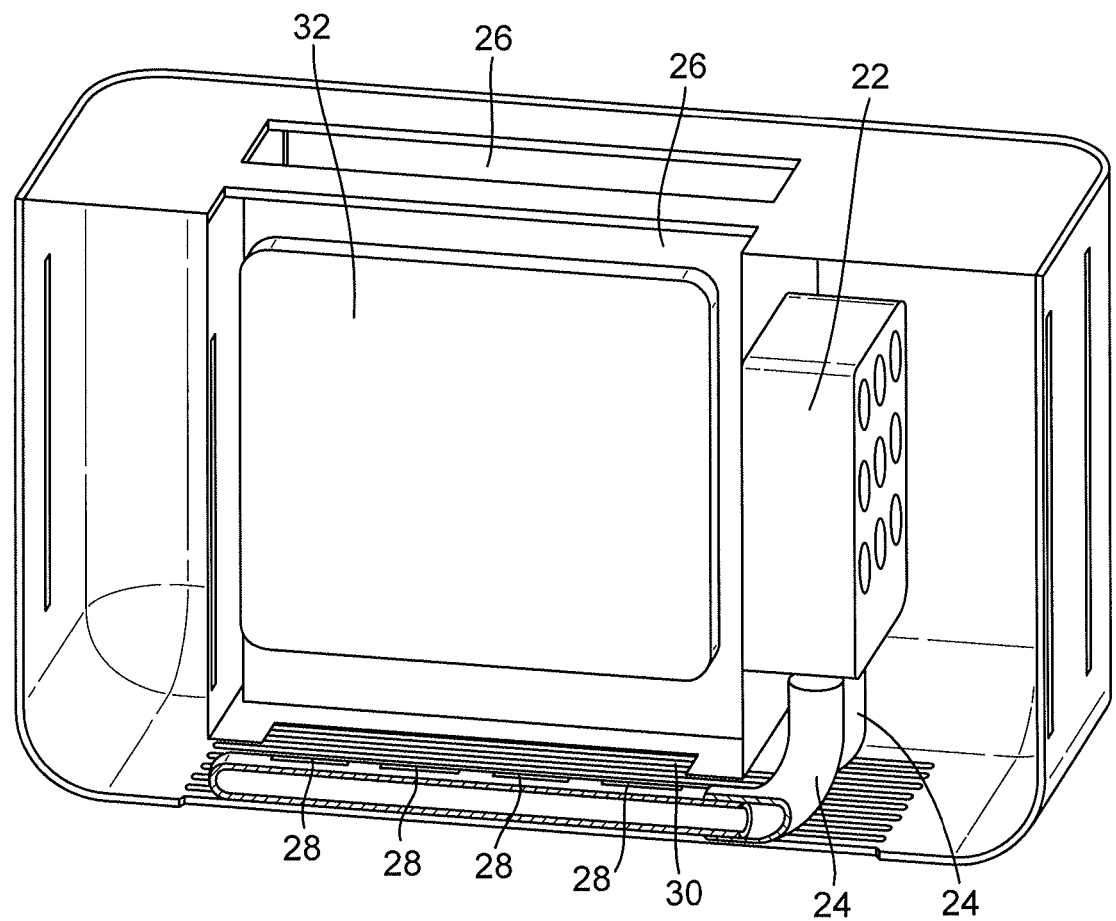
FIG. 5 shows an alternative embodiment of the invention in which an air duct is used for directing air flow.

FIG. 5 shows an alternative apparatus in accordance with the invention. In this embodiment, air flow is generated by a fan (not visible) inside a housing 22. The housing 22 is connected to air ducts 24, which are arranged to pass underneath the toasting chambers 26. The air ducts 24 contain air nozzles 28, arranged below a vent 30 into the toasting chambers 26. In use, the fan generates an air flow, which passes through the air ducts 24 to the air nozzles 28. These air nozzles 28 direct the air flow from the air ducts 24 vertically upwards through the vent 30 into the toasting chambers 26. The air then passes over the food item 32, drying the surface and increasing the speed with which the food item cooks, before passing out of the toasting chambers 26. This air flow is only present in the first mode of operation, as with the other embodiments discussed, as the fan is automatically switched off at the transition point 18 shown in FIG. 4. Alternatively, an air pump that does not have a fan could be used.

What is claimed is:

1. An apparatus for toasting a food item arranged to receive and support said food item in a toasting chamber during toasting and comprising a heating element arranged to heat a surface of the food item by radiant heat and a fan arranged to blow air across the food item and out of the toasting chamber, wherein the apparatus is arranged in an on state to operate in a drying mode in which the fan is operative and a browning mode in which the fan is turned off, wherein the apparatus comprises a controller arranged to change the apparatus from the drying mode to the browning mode automatically upon a predetermined condition being met and wherein the apparatus is arranged in the on state to heat the surface of the food item by radiant heat using a higher heating power during the drying mode than the browning mode, and wherein the controller is also arranged to transition the apparatus automatically to an off state, in which both the fan and the heating element are switched off, upon a further predetermined condition being met.

2. The apparatus as claimed in claim 1 comprising at least one additional element.

3. The apparatus as claimed in claim 2 wherein the at least one additional element is a radiant element.

4. The apparatus as claimed in claim 1 wherein the heating element comprises a plurality of element portions.

5. The apparatus as claimed in claim 4 wherein the plurality of element portions extend to more than one side of the food item.

6. The apparatus as claimed in claim 1 arranged to have a heating power in the second mode between 500 and 1500 W.

7. The apparatus as claimed in claim 1 arranged to have a heating power at least 50% higher in the drying mode compared to the browning mode.

8. The apparatus as claimed in claim 1 wherein the predetermined condition comprises a time.

9. The apparatus as claimed in claim 1 wherein the predetermined condition comprises a temperature.

10. The apparatus as claimed in claim 9 comprising a thermo-mechanical actuator for sensing said temperature.

11. The apparatus as claimed in claim 1 arranged to determine the predetermined condition electronically.

12. The apparatus as claimed in claim 1 arranged to support the food item in a vertical position in the apparatus.

13. The apparatus as claimed in claim 1 comprising a cover over a region containing the heating element and the food item.

14. The apparatus as claimed in claim 1 wherein the fan is arranged to blow air from a bottom to a top of the food item.

15. The apparatus as claimed in claim 1 comprising an air duct for conveying air from the fan to the food item.

16. The apparatus as claimed in claim 15 wherein the air duct terminates in at least one nozzle to direct the air flow.

17. An apparatus for toasting a food item arranged to receive and support said food item in a toasting chamber during toasting and comprising a heating element arranged to heat a surface of the food item by radiant heat and a forced air flow device arranged to blow air across the food item and out of the toasting chamber, wherein the apparatus is arranged in an on state to operate in a drying mode in which the forced air flow device is operative and a browning mode in which the air flow from the forced air flow device is turned off, wherein the apparatus comprises a controller arranged to change the apparatus from the drying mode to the browning mode automatically upon a predetermined condition being met and wherein the apparatus is arranged in the on state to heat the surface of the food item by radiant heat using a higher heating power during the drying mode than the browning mode, and wherein the controller is also arranged to transition the apparatus automatically to an off state, in which both the forced air flow device and the heating element are switched off, upon a further predetermined condition being met.

18. An apparatus for toasting a food item arranged to receive and support said food item in a toasting chamber during toasting, comprising a control arrangement, a fan arranged to blow air towards the food item and out of the toasting chamber and a heating arrangement arranged to apply heat to the food item, wherein the control arrangement is arranged to operate the fan initially at a first speed and after a fan transition point to stop the fan and wherein the control arrangement is arranged in an on state to operate the heating arrangement initially at a first power and after a heating transition point to operate the heating arrangement at a second, lower power to apply heat to the food item, wherein the fan transition point is determined by a predetermined condition being met, with the heating transition point being simultaneous or occurring automatically thereafter, and wherein the control arrangement is also arranged to transition the apparatus automatically to an off state, in which both the fan and the heating arrangement are switched off, upon a further predetermined condition being met.

19. The apparatus as claimed in claim 1, wherein the controller comprises a bimetallic actuator or a printed circuit board assembly.

20. The apparatus as claimed in claim 17, wherein the controller comprises a bimetallic actuator or a printed circuit board assembly.

21. The apparatus as claimed in claim 18, wherein the control arrangement comprises a bimetallic actuator or a printed circuit board assembly.

22. The apparatus as claimed in claim 1 wherein the fan is arranged outside the toasting chamber, said apparatus further comprising one or more ducts arranged to introduce air from the fan into the toasting chamber.

* * * * *